United States Patent
Yoshiya et al.

(10) Patent No.: US 12,304,997 B2
(45) Date of Patent: May 20, 2025

(54) POLYCARBONATE RESIN COMPOSITION

(71) Applicant: MITSUBISHI GAS CHEMICAL COMPANY, INC., Tokyo (JP)

(72) Inventors: Kohei Yoshiya, Ibaraki (JP); Noriyoshi Ogawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 596 days.

(21) Appl. No.: 17/639,698

(22) PCT Filed: Sep. 1, 2020

(86) PCT No.: PCT/JP2020/032986
§ 371 (c)(1),
(2) Date: Mar. 2, 2022

(87) PCT Pub. No.: WO2021/045027
PCT Pub. Date: Mar. 11, 2021

(65) Prior Publication Data
US 2022/0289906 A1    Sep. 15, 2022

(30) Foreign Application Priority Data
Sep. 6, 2019    (JP) .................................. 2019-163140

(51) Int. Cl.
C08G 64/06    (2006.01)
C08L 69/00    (2006.01)
C09D 11/102    (2014.01)
C09D 169/00    (2006.01)

(52) U.S. Cl.
CPC ............. *C08G 64/06* (2013.01); *C08L 69/00* (2013.01); *C09D 11/102* (2013.01); *C09D 169/00* (2013.01)

(58) Field of Classification Search
None
See application file for complete search history.

(56) References Cited

U.S. PATENT DOCUMENTS

| | | | |
|---|---|---|---|
| 5,922,882 A | 7/1999 | Mori et al. | |
| 2011/0118377 A1* | 5/2011 | Hauck | C08J 7/043 524/323 |
| 2012/0116028 A1 | 5/2012 | Suzuki et al. | |
| 2019/0010279 A1 | 1/2019 | Sugiyama et al. | |
| 2021/0207326 A1 | 7/2021 | Fushimi et al. | |

FOREIGN PATENT DOCUMENTS

| | | |
|---|---|---|
| JP | 4-268365 A | 9/1992 |
| JP | 9-316060 A | 12/1997 |
| JP | 2008-95046 A | 4/2008 |
| JP | 2008-101191 A | 5/2008 |
| JP | 2014-24789 A | 2/2014 |
| JP | 2016-160291 A | 9/2016 |
| JP | 2018-51959 A | 4/2018 |
| JP | 6340811 B2 | 6/2018 |
| WO | 2011/007427 A1 | 1/2011 |
| WO | 2017/047560 A1 | 3/2017 |
| WO | 2017/126432 A1 | 7/2017 |

OTHER PUBLICATIONS

Machine translation of JP 2008-101191 A, retrieved Sep. 2024 (Year: 2024).*
Machine translation of JP 2008-095046 A, retrieved Sep. 2024 (Year: 2024).*
International Search Report and Written Opinion of the International Searching Authority issued in International Patent Application No. PCT/JP2020/032986, dated Oct. 20, 2020, along with an English translation thereof.

* cited by examiner

*Primary Examiner* — Katarzyna I Kolb
(74) *Attorney, Agent, or Firm* — GREENBLUM & BERNSTEIN P.L.C.

(57) ABSTRACT

The present application provides a polycarbonate-based coating resin composition having high adhesiveness, more specifically provides a polycarbonate resin composition that contains not less than 0.1 parts by mass of a polyisocyanate compound and 100 parts by mass of a terminal-modified polycarbonate resin (A) having a structural unit (2) and a terminal structure represented by structural formula (1). [In formula (1) and formula (2), $R_1$-$R_7$, X, Y, Z, and a are as described in the description.]

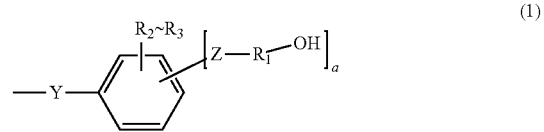

(1)

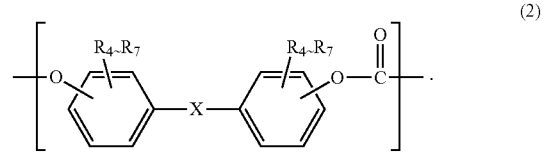

(2)

18 Claims, No Drawings

POLYCARBONATE RESIN COMPOSITION

FIELD OF THE INVENTION

The present invention relates to a polycarbonate resin composition, more particularly, to a polycarbonate resin composition which can be used as a polycarbonate coating resin solution having excellent adhesiveness to a substrate.

BACKGROUND ART

Polycarbonate resins are excellent in transparency and formability and also has superior mechanical properties like impact resistance, and thus they are utilized in electric appliances and machine products like automobiles. In particular, polycarbonate resin solutions are known for obtaining thin films having functional properties and for coating objects (Patent literature 1)

Although coatings resulting from polycarbonate resin solutions are excellent in durability such as impact resistance, they are inferior in adhesiveness and therefore they are rather known for their application to easily peelable polish (Patent literature 2). Hence, there is room for improvement in adhesiveness between such coatings and substrates.

As resin compositions composed of a blend of a polycarbonate resin and other resin, for example, resin blend compositions of a polycarbonate resin and a polyphenylene ether resin are known, but such resin blend compositions cannot achieve improved adhesiveness (Patent literature 3). Thus, development of a resin blend composition composed of a polycarbonate resin and other resin, which can achieve improved adhesiveness between the coating and a substrate has been desired.

PRIOR ART LITERATURES

Patent Literatures

Patent literature 1: JP H04-268365A
Patent literature 2: JP 2014-024789A
Patent literature 3: Japanese Patent No. 6340811

SUMMARY OF INVENTION

Problem to be Solved by Invention

The present invention provides a resin blend composition comprising a polycarbonate resin and other resin, which can achieve improved adhesiveness between the coating and a substrate.

Means for Solving the Problem

The present inventors have gone through extensive research, and as a result of which found that a resin blend composition comprising a polycarbonate resin having a specific molecular terminal and a polyisocyanate compound can be used in a solution for forming a strong coating that is highly adhesive to a substrate, thereby accomplishing the present invention.

Specifically, the present invention comprises the following aspects.

<1> A polycarbonate resin composition comprising:
100 parts by mass of a terminal-modified polycarbonate resin (A) having a terminal structure represented by Structural formula (1) below and a structural unit (2) below; and not less than 0.1 parts by mass of a polyisocyanate compound,

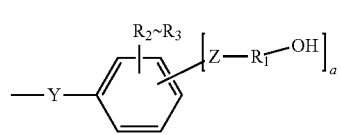

(in Formula (1), $R_1$ represents an optionally substituted C1-C20 alkylene group or C2-C20 alkenylene group, $R_2$ and $R_3$ each independently represent hydrogen, a C1-C20 alkyl group, a C1-C10 alkoxy group or a C6-C12 aryl group, Z represents an ether bond, a carbonyl group, an ester bond or a single bond, a is an integer of 1-3, and Y represents an ether bond or an ester group),

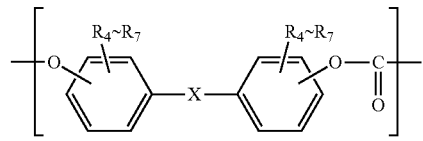

(in Formula (2), $R_4$-$R_7$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group, and X is —O—, —S—, —SO—, —SO$_2$—, —CO— or a divalent group represented by any of General formulae (3)-(8) below)

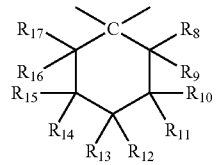

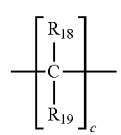

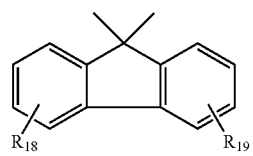

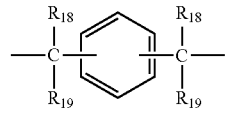

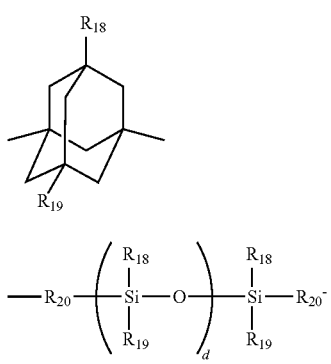

(7)

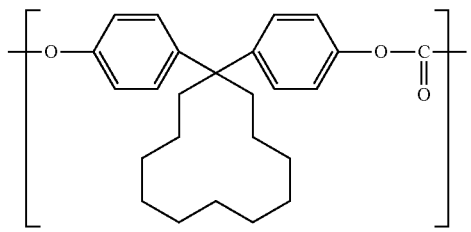

(11)

(8)

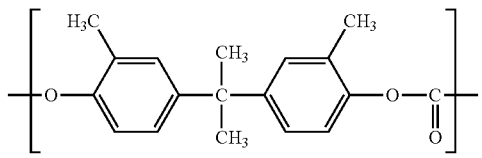

(12)

(in General formula (3),

R$_8$-R$_{17}$ each independently represent hydrogen or a C1-C3 alkyl group, and at least one of R$_8$-R$_{17}$ represents a C1-C3 alkyl group; and in General formulae (4)-(8), R$_{18}$ and R$_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or R$_{18}$ and R$_{19}$ bind to each other to form a C3-C20 carbocyclic ring or a C1-C20 heterocyclic ring, R$_{20}$ is an optionally substituted C1-C9 alkylene group, c represents an integer of 0-20, and d represents an integer of 1-500).

<2> The polycarbonate resin composition according to <1> above, wherein, in Structural formula (1) above, Z represents a single bond, R$_1$ is a C1-C2 alkylene group, and R$_2$-R$_3$ are hydrogen.

<3> The polycarbonate resin composition according to either one of <1> and <2> above, wherein, in the structural unit (2), X is —O—, —S— or a divalent group represented by either one of General formulae (3)-(4) above.

<4> The polycarbonate resin composition according to any one of <1> to <3> above, wherein the structural unit (2) is any one or more kinds selected from the group consisting of Formulae (9)-(22) below:

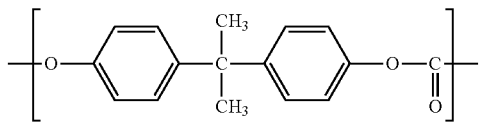

(13)

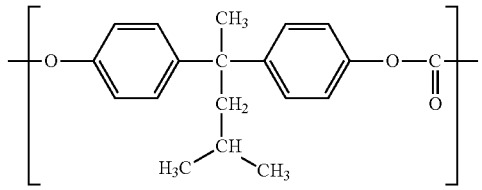

(14)

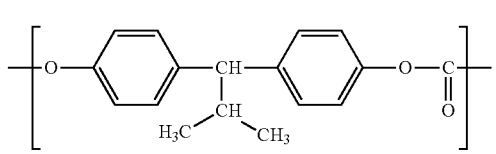

(15)

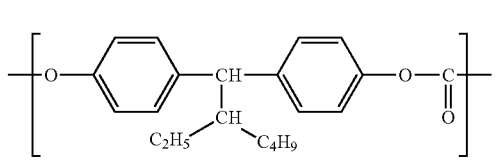

(16)

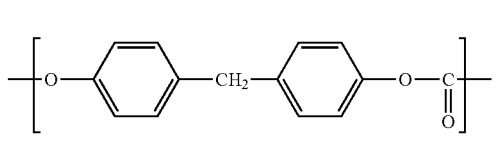

(17)

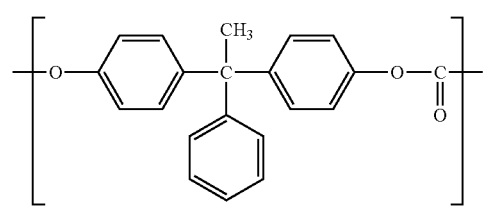

(9)

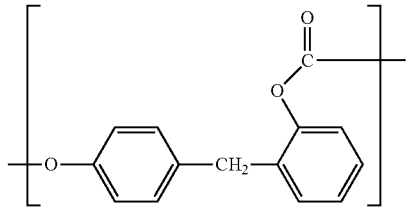

(18)

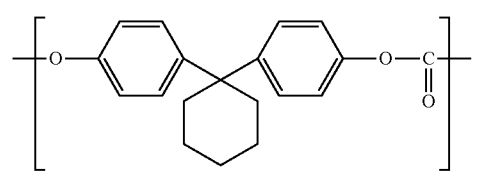

(10)

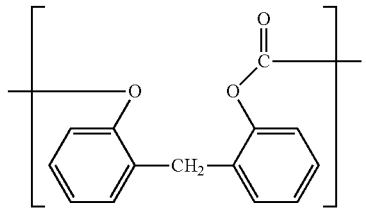

(19)

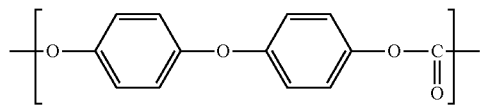
(20)

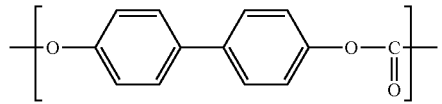
(21)

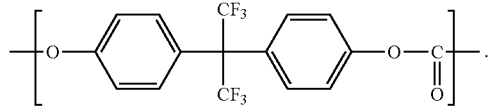
(22)

<5> The polycarbonate resin composition according to any one of <1> to <3> above, wherein the structural unit (2) is derived from a bisphenol compound.

<6> The polycarbonate resin composition according to <5> above, wherein the bisphenol compound is selected from the group consisting of bisphenol A, bisphenol AP, bisphenol Z, bisphenol CD, bisphenol C, bisphenol IOTD, bisphenol IBTD, bisphenol MIBK and bisphenol AF.

<7> The polycarbonate resin composition according to any one of <1> to <6> above, wherein the terminal structure represented by Structural formula (1) above is p-hydroxyphenethyl alcohol (PHEP).

<8> The polycarbonate resin composition according to any one of <1> to <7> above, wherein the terminal structure represented by Structural formula (1) is contained in an amount of not less than 0.5 mol % relative to the amount of the structural unit (2).

<9> The polycarbonate resin composition according to any one of <1> to <8> above, wherein the polyisocyanate compound is an isocyanate compound containing two or more isocyanate groups per molecule.

<10> The polycarbonate resin composition according to <9> above, wherein the isocyanate compound is a diisocyanate compound.

<11> The polycarbonate resin composition according to any one of <1> to <10> above, wherein the viscosity average molecular weight of the polycarbonate resin composition is 10,000-60,000.

<12> A crosslinked polymer composition, wherein at least a part of the polycarbonate resin composition according to any one of <1> to <11> above is crosslinked.

<13> A resin solution comprising the polycarbonate resin composition according to any one of <1> to <11> above or the crosslinked polymer composition according to <12> above, and a non-halogenated organic solvent.

<14> A print ink, in which the resin solution according to <13> above is used as a binder resin solution.

<15> A substrate film applied with the print ink according to <14> above.

<16> A film or coating, comprising the polycarbonate resin composition according to any one of <1> to <11> above or the crosslinked polymer composition according to <12> above.

<17> The resin solution according to <13> above, wherein the non-halogenated organic solvent comprises one or more kinds of solvents selected from the group consisting of an ester-based solvent, an ether-based solvent, a carbonate ester-based solvent and a ketone-based solvent.

EFFECTS OF INVENTION

A resin coating resulting from a resin solution comprising the resin composition of the present invention is advantageous in that it is highly adhesive to a substrate and less prone to peeling as compared to conventional polycarbonate resin coatings.

MODE FOR CARRYING OUT INVENTION

1. Polycarbonate Resin Composition

The polycarbonate resin composition of the present invention comprises:

a terminal-modified polycarbonate resin (A) having a terminal structure represented by Structural formula (1) below and the structural unit (2) below; and a polyisocyanate compound,

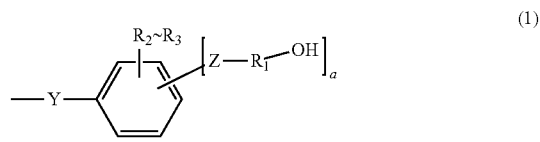
(1)

(in Formula (1), $R_1$ represents an optionally substituted C1-C20 alkylene group or C2-C20 alkenylene group, $R_2$ and $R_3$ each independently represent hydrogen, a C1-C20 alkyl group, a C1-C10 alkoxy group or a C6-C12 aryl group, Z represents an ether bond, a carbonyl group, an ester bond or a single bond, a is an integer of 1-3, and Y represents an ether bond or an ester group),

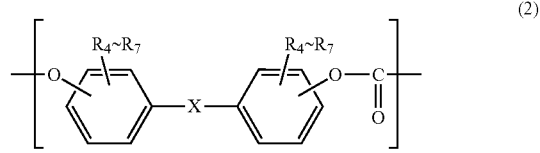
(2)

(in Formula (2), $R_4$-$R_7$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group, and X is —O—, —S—, —SO—, —SO$_2$—, —CO— or a divalent group represented by any of General formulae (3)-(8) below)

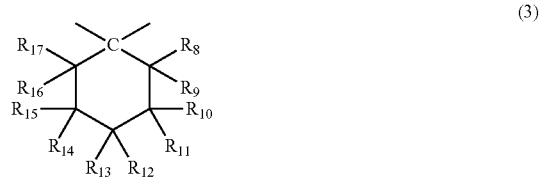
(3)

-continued

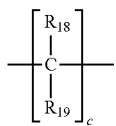
(4)

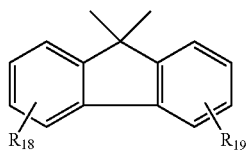
(5)

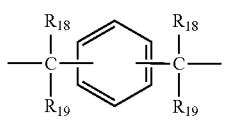
(6)

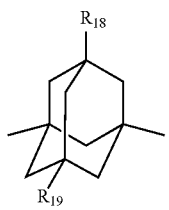
(7)

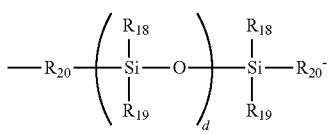
(8)

(in General formula (3), $R_8$-$R_{17}$ each independently represent hydrogen or a C1-C3 alkyl group, and at least one of $R_8$-$R_{17}$ represents a C1-C3 alkyl group; and in General formulae (4)-(8), $R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{18}$ and $R_{19}$ bind to each other to form a C3-C20 carbocyclic ring or a C1-C20 heterocyclic ring, $R_{20}$ is an optionally substituted C1-C9 alkylene group, c represents an integer of 0-20, and d represents an integer of 1-500).

In one embodiment of the present invention, the polycarbonate resin composition comprises 100 parts by mass of a terminal-modified polycarbonate resin (A) having a terminal structure represented by Structural formula (1) and a structural unit (2), and not less than 0.1 parts by mass of a polyisocyanate compound. In one embodiment of the present invention, the amount of the polyisocyanate compound contained in the polycarbonate resin composition may be not less than 0.1 parts by mass, preferably not less than 1.0 parts by mass, more preferably not less than 3.0 parts by mass, still more preferably not less than 5.0 parts by mass, and particularly preferably not less than 8.0 parts by mass, relative to 100 parts by mass of the terminal-modified polycarbonate resin (A).

Since the adhesive effect can be achieved even if the polyisocyanate compound (B) is used in an excessive amount with respect to the polycarbonate resin (A), the upper limit of the content of the polyisocyanate compound (B) in the resin composition is not so important, but in one embodiment of the present invention, the amount of the polyisocyanate compound (B) may be, for example, not more than 50 parts by mass, preferably not more than 45 parts by mass, more preferably not more than 40 parts by mass, still more preferably not more than 35 parts by mass, and particularly preferably not more than 30 parts by mass, relative to 100 parts by mass of the polycarbonate resin (A).

2. Terminal-Modified Polycarbonate Resin (A)

According to the present invention, as described above, the terminal-modified polycarbonate resin (A) contained the polycarbonate resin composition has a terminal structure represented by Structural formula (1) below and a structural unit (2) below:

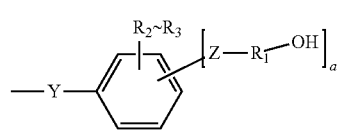
(1)

(in Formula (1), $R_1$ represents an optionally substituted C1-C20 alkylene group or C2-C20 alkenylene group, $R_2$ and $R_3$ each independently represent hydrogen, a C1-C20 alkyl group, a C1-C10 alkoxy group or a C6-C12 aryl group, Z represents an ether bond, a carbonyl group, an ester bond or a single bond, a is an integer of 1-3, and Y represents an ether bond or an ester group),

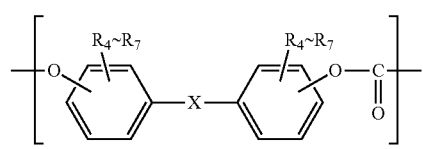
(2)

(in Formula (2), $R_4$-$R_7$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group, and X is —O—, —S—, —SO—, —SO$_2$—, —CO—, or a divalent group represented by any of General formulae (3)-(8) below),

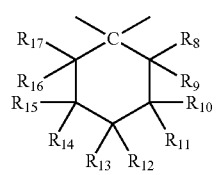
(3)

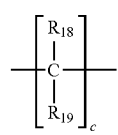
(4)

-continued

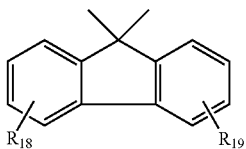 (5)

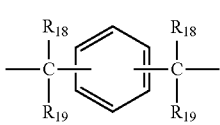 (6)

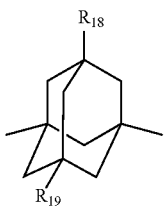 (7)

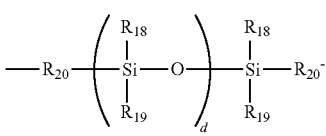 (8)

(in General formula (3), $R_8$-$R_{17}$ each independently represent hydrogen or a C1-C3 alkyl group, and at least one of $R_8$-$R_{17}$ represents a C1-C3 alkyl group; and in General formulae (4)-(8), $R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{18}$ and $R_{19}$ bind to each other to form a C3-C20 carbocyclic ring or a C1-C20 heterocyclic ring, $R_{20}$ is an optionally substituted C1-C9 alkylene group, c represents an integer of 0-20, and d represents an integer of 1-500).

In one embodiment of the present invention, the terminal structure represented by Structural formula (1) may be contained in an amount of 0.5 mol % to 12 mol % (inclusive), preferably 1.0 mol % to 10 mol % (inclusive), and more preferably 1.5 mol % to 8 mol % (inclusive) relative to the amount of the structural unit (2).

(i) Terminal Structure Represented by Structural Formula (1)

In one embodiment of the present invention, Ri in Structural formula (1) represents an optionally substituted C1-C20 alkylene group or C2-C20 alkenylene group. In one embodiment of the present invention, Ri in Structural formula (1) may represent an optionally substituted C1-C20 alkylene group, preferably an optionally substituted C1-C15 alkylene group, more preferably an optionally substituted C1-C10 alkylene group, still more preferably an optionally substituted C1-C5 alkylene group, and yet still more preferably an optionally substituted C1-C2 alkylene group. In a preferred embodiment of the present invention, $R_1$ in Structural formula (1) may be a C1-C2 alkylene group.

In one embodiment of the present invention, $R_2$ and $R_3$ in Structural formula (1) each independently represent hydrogen, a C1-C20 alkyl group, a C1-C10 alkoxy group, or a C6-C12 aryl group. In one embodiment of the present invention, $R_2$ and $R_3$ in Structural formula (1) may preferably each independently represent hydrogen, a C1-C10 alkyl group, a C1-C5 alkoxy group or a C6-C10 aryl group, and more preferably hydrogen, a C1-C5 alkyl group, a C1-C3 alkoxy group or a C6-C8 aryl group. In a preferred embodiment of the present invention, $R_2$ and $R_3$ in Structural formula (1) may be hydrogen.

In one embodiment of the present invention, Z in Structural formula (1) represents an ether bond, a carbonyl group, an ester bond or a single bond. In one embodiment of the present invention, Z in Structural formula (1) may be an ether bond. In another embodiment of the present invention, Z in Structural formula (1) may be a carbonyl group. In yet another embodiment of the present invention, Z in Structural formula (1) may be an ester bond. In yet still another embodiment of the present invention, Z in Structural formula (1) may be a single bond. In a preferred embodiment of the present invention, Z in Structural formula (1) may be a single bond.

In one embodiment of the present invention, a in Structural formula (1) is an integer of 1-3. In one embodiment of the present invention, a in Structural formula (1) may be 1 or 2 or 3.

In one embodiment of the present invention, Y in Structural formula (1) represents an ether bond or an ester group. In one embodiment of the present invention, Y in Structural formula (1) may be an ether bond. In one embodiment of the present invention, Y in Structural formula (1) may be an ester group.

In a preferred embodiment of the present invention, Z in Structural formula (1) may represent a single bond, $R_1$ may be a C1-C2 alkylene group, and $R_2$-$R_3$ may be hydrogen.

In one embodiment of the present invention, examples of a monohydric phenol that results Structural formula (1) at the molecular terminal include, but not limited to p-hydroxyphenethyl alcohol (=tyrosol), m-hydroxyphenethyl alcohol, o-hydroxyphenethyl alcohol, o-hydroxybenzyl alcohol (=salicyl alcohol), p-hydroxybenzyl alcohol, m-hydroxybenzyl alcohol, vanillyl alcohol, homovanillyl alcohol, 3-(4-hydroxy-3-methoxyphenyl)-1-propanol, sinapyl alcohol, coniferyl alcohol and p-coumaryl alcohol. In terms of reactivity, p-hydroxyphenethyl alcohol and p-hydroxybenzyl alcohol are preferable, and p-hydroxyphenethyl alcohol is more preferable among others.

In one embodiment of the present invention, the terminal structure represented by Structural formula (1) can be derived from p-hydroxyphenethyl alcohol (PHEP).

(ii) Structural Unit (2)

In one embodiment of the present invention, $R_4$-$R_7$ of the structural unit (2) each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group. In one embodiment of the present invention, $R_4$-$R_7$ of the structural unit (2) may preferably each independently represent hydrogen, fluorine, chlorine, bromine, iodine or an optionally substituted C1-C10 alkyl group, C6-C10 aryl group, C2-C8 alkenyl group, C1-05 alkoxy group or C7-C15 aralkyl group, and more preferably hydrogen, fluorine, chlorine, bromine, iodine or an optionally substituted C1-C5 alkyl group, C6-C8 aryl group, C2-C5 alkenyl group, C1-C2 alkoxy group or C7-C12 aralkyl group. In a preferred embodiment of the present invention, $R_4$-$R_7$ may each independently represent hydrogen or a methyl group.

In one embodiment of the present invention, X of the structural unit (2) is —O—, —S—, —SO—, —SO$_2$—, —CO—, or a divalent group represented by any of General formulae (3)-(8) below:

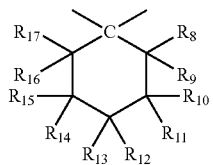
(3)

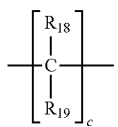
(4)

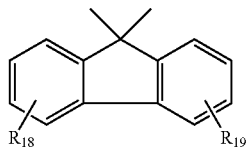
(5)

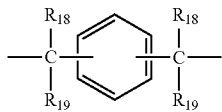
(6)

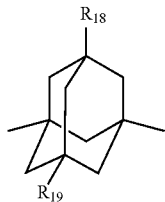
(7)

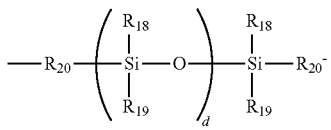
(8)

(in General formula (3), $R_8$-$R_{17}$ each independently represent hydrogen or a C1-C3 alkyl group, and at least one of $R_8$-$R_{17}$ represents a C1-C3 alkyl group; and in General formulae (4)-(8), $R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{18}$ and $R_{19}$ bind to each other to form a C3-C20 carbocyclic ring or a C1-C20 heterocyclic ring, $R_{20}$ is an optionally substituted C1-C9 alkylene group, c represents an integer of 0-20, and d represents an integer of 1-500).

In one embodiment of the present invention, when X of the structural unit (2) is a divalent group represented by General formula (3) above, $R_8$-$R_{17}$ each independently represent hydrogen or a C1-C3 alkyl group, preferably hydrogen or a methyl group while at least one of $R_8$-$R_{17}$ represents a C1-C3 alkyl group. In one embodiment of the present invention, $R_8$-$R_{17}$ may each independently represent hydrogen, methyl, ethyl, n-propyl or isopropyl while at least one of $R_8$-$R_{17}$ is methyl, ethyl, n-propyl or isopropyl.

In one embodiment of the present invention, when X of the structural unit (2) is a divalent group represented by any of General formulae (4)-(8) above, $R_{18}$ and $R_{19}$ may each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, preferably hydrogen, a halogen, an optionally substituted C1-C10 alkyl group, an optionally substituted C1-C3 alkoxy group, an optionally substituted C6-C8 aryl group, an optionally substituted C7-C12 aralkyl group or an optionally substituted C2-C5 alkenyl group. In another embodiment of the present invention, $R_{18}$ and $R_{19}$ may bind to each other to form a C3-C20 carbocyclic ring or a C1-C20 heterocyclic ring, preferably a C3-C12 carbocyclic ring or a C1-C12 heterocyclic ring. In a preferred embodiment of the present invention, $R_{18}$ and $R_{19}$ may bind to each other to form a C3-C12 carbocyclic ring. In one embodiment of the present invention, when X of the structural unit (2) is a divalent group represented by General formula (8) above, $R_{20}$ may be an optionally substituted C1-C9 alkylene group, and preferably an optionally substituted C1-C5 alkylene group. In one embodiment of the present invention, when X of the structural unit (2) is a divalent group represented by any one of General formulae (4)-(8) above, c may represent an integer of 0-20 and d may represent an integer of 1-500, preferably c may represent an integer of 0-12 and d may represent an integer of 1-300, and more preferably c may represent an integer of 0-6 and d may represent an integer of 1-100.

In one embodiment of the present invention, X of the structural unit (2) may be —O—, —S— or a divalent group represented by either one of General formulae (3)-(4) above.

In one embodiment of the present invention, examples of a diol that results the structural unit (2) include, but not limited to, 4,4'-biphenyldiol, bis(4-hydroxyphenyl)methane (bisphenol F; BPF), bis(2-hydroxyphenyl)methane, 2,4'-dihydroxydiphenyl methane, bis(4-hydroxyphenyl)ether, bis (4-hydroxyphenyl)sulfone, 2,4'-dihydroxydiphenyl sulfone, bis(2-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane (bisphenol E; BPE), 1,1-bis(4-hydroxyphenyl)-1-phenylethane (bisphenol AP; BPAP), bis (4-hydroxyphenyl)diphenyl methane (bisphenol BP; BPBP), 2,2-bis(4-hydroxyphenyl)propane, 2,2-bis(4-hydroxy-3-methylphenyl)propane, 1,1-bis(4-hydroxy-3-methylphenyl) ethane, bis(4-hydroxy-3-methylphenyl)methane, 2,2-bis(4-hydroxy-3-t-butylphenyl)propane, 2,2-bis(4-hydroxyphenyl)butane (bisphenol B; BPB), 1,1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cycloundecane, 1,1-bis(4-hydroxyphenyl) cyclododecane (bisphenol CD), 2,2-bis(4-hydroxy-3-allylphenyl)propane, 3,3,5-trimethyl-1,1-bis(4-hydroxyphenyl)cyclohexane, 9,9-bis(4-hydroxy-3-ethylphenyl)fluorene, 9,9-bis(4-hydroxy-3-methylphenyl) fluorene, 9,9-bis(4-hydroxyphenyl)fluorene, α,ω-bis[3-(o-hydroxyphenyl)propyl]polydimethyl diphenyl random copolymer siloxane, α,ω-bis[3-(o-hydroxyphenyl)propyl]

polydimethyl siloxane, 4,4'-[1,4-phenylene bis(1-methylethylidene)]bisphenol, 4,4'-[1,3-phenylene bis(1-methylethylidene)]bisphenol, 2,2-bis(4-hydroxy-3-methylphenyl)propane (bisphenol C; BPC), 2,2-bis(4-hydroxy-3-isopropylphenyl)propane (bisphenol G), 1,1-bis(4-hydroxyphenyl)-2-ethylhexane (bisphenol IOTD), 1,1-bis(4-hydroxyphenyl)-2-methylpropane (bisphenol IBTD), 1,1-bis(4-hydroxyphenyl)-2-methylpentane (bisphenol MIBK), 5,5'-(1-methylethylidene)-bis[1,1'-(bisphenyl)-2-ol]propane (bisphenol PH), 1,1-bis(4-hydroxyphenyl)-3,3,5-trimethylcyclohexane (bisphenol TMC), 2,2-bis(4-hydroxyphenyl)-4-methylpentane, 1,1-bis(4-hydroxyphenyl)decane, 1,3-bis(4-hydroxyphenyl)-5,7-dimethyladamantane and 2,2-bis(4-hydroxyphenyl)hexafluoropropane (bisphenol AF; BPAF). One or more kinds of them may be used alone or in combination. Among them, bisphenol A, bisphenol AP, bisphenol Z, bisphenol CD, bisphenol TMC, bisphenol C, bisphenol IOTD, bisphenol IBTD, bisphenol MIBK and bisphenol AF are particularly preferable. Furthermore, 2,2-bis(4-hydroxy-3-methylphenyl)propane (bisphenol C; BPC) or 2,2-bis(4-hydroxyphenyl)hexafluoropropane (bisphenol AF; BPAF) is preferably used as the main component. Since 2,2-bis(4-hydroxyphenyl)propane (bisphenol A; BPA) has poor solubility in a non-halogenated organic solvent when used alone, 2,2-bis(4-hydroxyphenyl)propane is preferably not used by itself in the present invention.

In one embodiment of the present invention, the structural unit (2) may be, but not limited to, any one or more kinds selected from the group consisting of Formulae (9)-(22) below.

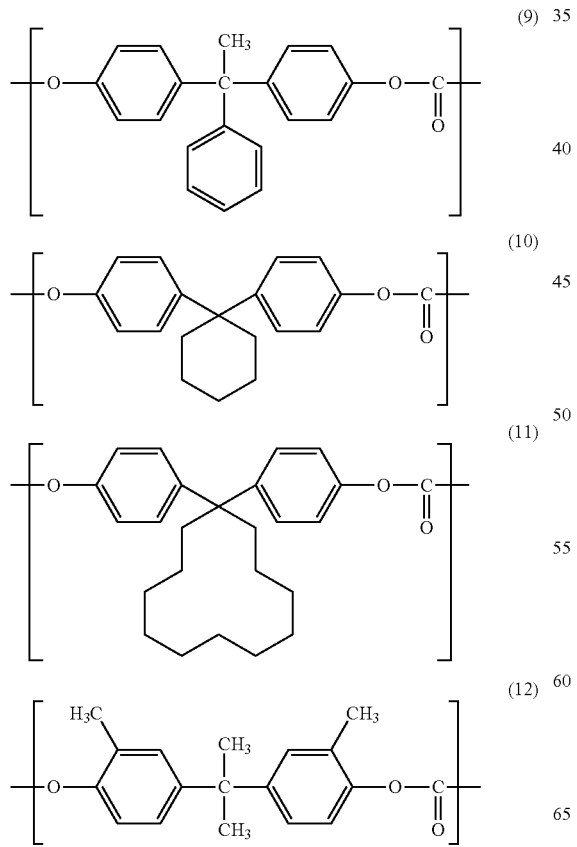

(9)

(10)

(11)

(12)

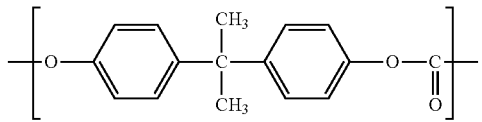

(13)

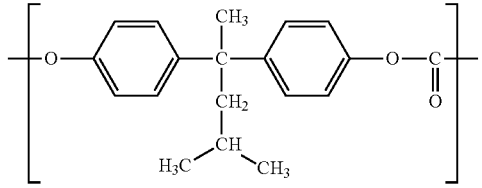

(14)

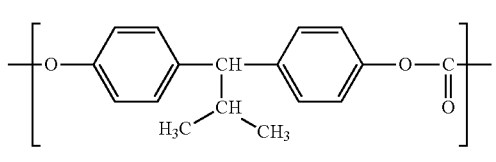

(15)

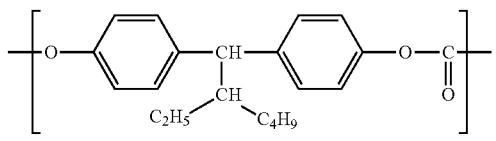

(16)

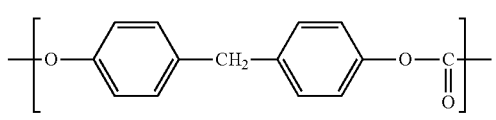

(17)

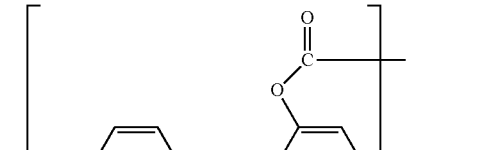

(18)

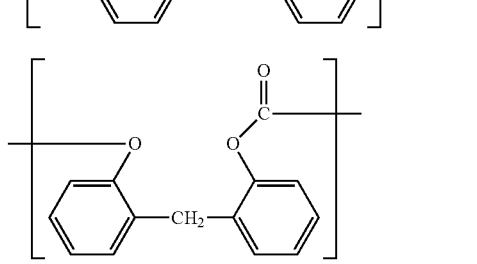

(19)

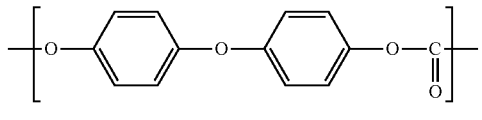

(20)

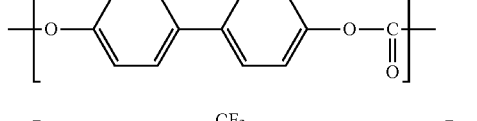

(21)

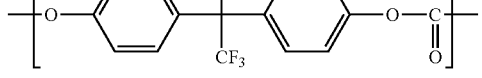

(22)

In one embodiment of the present invention, the structural unit (2) may be derived from a bisphenol compound. In one embodiment of the present invention, the bisphenol compound may be selected from, but not limited to, the group consisting of bisphenol A (2,2-bis(4-hydroxyphenyl)propane), bisphenol AP (1,1-bis(4-hydroxyphenyl)-1-phenylethane), bisphenol Z (1,1-bis(4-hydroxyphenyl)cyclohexane), bisphenol CD (1,1-bis(4-hydroxyphenyl) cyclododecane), bisphenol C (2,2-bis(3-methyl-4-hydroxyphenyl)propane), bisphenol IOTD (1,1-bis(4-hydroxyphenyl)-2-ethylhexane), bisphenol IBTD (1,1-bis (4-hydroxyphenyl)-2-methylpropane), bisphenol MIBK (1,1-bis(4-hydroxyphenyl)-2-methylpentane) and bisphenol AF (2,2-bis(4-hydroxyphenyl)hexafluoropropane).

(iii) Production of Terminal-Modified Polycarbonate Resin (A)

The terminal-modified polycarbonate resin (A) of the present invention can be produced by a common technique.

The polycarbonate resin used in a coating resin solution of the present invention can be produced by allowing a monohydric phenol that results Structural formula (1) at the molecular terminal, a bisphenol that results the structural unit (2) and a carbonate ester-forming compound to react, where a known method employed for producing a polycarbonate derived from bisphenol A, for example, direct reaction between a bisphenol and phosgene (phosgene method), transesterification between a bisphenol and bisaryl carbonate (transesterification method), or the like can be employed.

According to the phosgene method, a bisphenol, a monohydric phenol that results Structural formula (1) and phosgene are allowed to react usually in the presence of a common acid binding agent and a solvent. The acid binding agent may be, for example, pyridine, a hydroxide of an alkali metal such as sodium hydroxide or potassium hydroxide, or the like, while the solvent may be, for example, methylene chloride, chloroform or the like. Furthermore, in order to promote the polycondensation reaction, a catalyst, for example, a tertiary amine such as triethylamine or a quaternary ammonium salt such as benzyltriethylammonium chloride, is preferably used. While the monohydric phenol that results Structural formula (1) serves as an agent for adjusting the degree of polymerization, an additional monohydric phenol such as phenol, p-t-butylphenol, p-cumylphenol or a long-chain alkyl-substituted phenol can also be used together in an amount of less than 50% by mass relative to the amount of the monohydric phenol that results Structural formula (1). In addition, an antioxidant such as sodium sulfite or hydrosulfite, a branching agent such as phloroglucin or isatin bisphenol, or the like can also be added in a small amount as desired. The reaction is suitably carried out usually at a temperature in a range of 0-150° C., preferably at a temperature in a range of 5-40° C. While the reaction time varies depending on the reaction temperature, it is usually 0.5 minutes to 10 hours, and preferably 1 minute to 2 hours. Moreover, pH of the reaction system during the reaction is preferably maintained at 10 or higher.

Alternatively, according to the transesterification method, a bisphenol, a monohydric phenol that results Structural formula (1) and a bisaryl carbonate are mixed and allowed to react at a high temperature under reduced pressure. Examples of the bisaryl carbonate include bisallyl carbonates such as diphenyl carbonate, di-p-tolyl carbonate, phenyl-p-tolyl carbonate, di-p-chlorophenyl carbonate and dinaphthyl carbonate. One or more kinds of these compounds may be used alone or in combination. The reaction takes place usually at a temperature in a range of 150-350° C., preferably at a temperature in a range of 200-300° C., and the pressure is reduced to a final pressure of preferably 1 mmHg or lower so that the phenol resulting from the bisaryl carbonate generated by the transesterification reaction is distilled away from the system. While the reaction time varies depending on the reaction temperature and the degree of pressure reduction, it is usually about 1-24 hours. The reaction is preferably carried out in an inert gas atmosphere such as nitrogen or argon. In addition, a small amount of a molecular weight modifier in addition to the monohydric phenol that results Structural formula (1), an antioxidant or a branching agent can also be added as desired to carry out the reaction.

The polycarbonate resin of the present invention preferably bears solvent solubility, coating property, adhesiveness, scratch resistance, impact resistance and else in a favorable balance, which are crucial for the coating forming resin to be used in a coating resin solution. If the intrinsic viscosity of the resin is too low, strength of the scratch resistance and the impact resistance will be insufficient, whereas if the intrinsic viscosity is too high, the solvent solubility will be poor and the viscosity of the solution will be high, rendering the coating property poor. A desirable intrinsic viscosity is preferably in a range of 0.3-2.0 dl/g, and more preferably in a range of 0.35-1.5 dl/g.

3. Polyisocyanate Compound

According to the present invention, the polycarbonate resin composition contains not less than 0.1 parts by mass of a polyisocyanate compound relative to 100 parts by mass of the terminal-modified polycarbonate resin (A) described above. The polyisocyanate compound contained in the polycarbonate resin composition is preferably a compound that contains two or more isocyanate groups per molecule. By using a compound containing two or more isocyanate groups per molecule as the polyisocyanate compound, a crosslinked structure can be formed in the polycarbonate resin composition. As a result, the polycarbonate resin composition can be made into a crosslinked polymer composition.

Examples of the polyisocyanate compound that can be used in the present invention include, but not limited to, an aliphatic polyisocyanate, an alicyclic polyisocyanate, an aromatic polyisocyanate and an aralipathic polyisocyanate.

Examples of the aliphatic polyisocyanate include, but not limited to, 1,3-trimethylene diisocyanate, 1,4-tetramethylene diisocyanate, 1,6-hexamethylene diisocyanate, 1,9-nonamethylene diisocyanate, 1,10-decamethylene diisocyanate, 2,2,4-trimethylhexamethylene diisocyanate, 2,4,4-trimethylhexamethylene diisocyanate, lysine diisocyanate, 2,2'-diethyl ether diisocyanate and dimer acid diisocyanate.

Examples of the alicyclic polyisocyanate include, but not limited to, 1,4-cyclohexane diisocyanate, 1,3-bis(isocyanatomethyl)cyclohexane, 1,4-bis(isocyanatomethyl)cyclohexane, 3-isocyanatomethyl-3,3,5-trimethylcyclohexane (IPDI, isophorone diisocyanate), bis-(4-isocyanate cyclohexyl)methane (hydrogenated MDI), hydrogenated (1,3- or 1,4-)xylylene diisocyanate and norbornane diisocyanate.

Examples of the aromatic polyisocyanate include, but not limited to, 2,4'-diphenyl methane diisocyanate, 4,4'-diphenyl methane diisocyanate, 1,4-phenylene diisocyanate, 2,4-tolylene diisocyanate, 2,6-tolylene diisocyanate, 3,3'-dimethyl-4,4'-diisocyanate biphenyl, 3,3'-dimethyl-4,4'-diisocyanate diphenyl methane, 1,5-naphthylene diisocyanate, 4,4'-diphenyl ether diisocyanate and tetrachlorophenylene diisocyanate.

Examples of the aralipahtic polyisocyanate include, but not limited to, 1,3-xylylene diisocyanate, 1,4-xylylene diisocyanate, (α,α,α',α'-tetramethylxylylene diisocyanate and 3,3'-methylene ditolylene-4,4'-diisocyanate.

One or more kinds of these polyisocyanate compounds may be used alone or in combination.

In one embodiment of the present invention, the polyisocyanate compound may be, for example, a diisocyanate compound having two isocyanate groups per molecule, or a prepolymerized diisocyanate obtained by reacting a diisocyanate with a diol, a diamine or the like. Alternatively, it may be a tri- or higher functional isocyanate compound obtained by partial oligomerization of the diisocyanate compound. Any known method may be employed for the oligomerization of the diisocyanate compound, where examples of the oligomerization of the diisocyanate compound include isocyanurate formation, allophanate formation, biuret formation, and urethane formation or urea formation from a polyfunctional alcohol or a polyfunctional amine, respectively. In one embodiment of the present invention, the polyisocyanate compound may be a polyisocyanate having three or more isocyanate groups, for example, triphenylmethane triisocyanate.

In one embodiment of the present invention, the polyisocyanate compound may be a diisocyanate compound containing two isocyanate groups per molecule. Examples of the diisocyanate compound that can be used in the present invention include the followings:

aromatic diisocyanate compounds such as tolylene diisocyanate (TDI), diphenyl methane diisocyanate (MDI), phenylene diisocyanate and naphthylene diisocyanate (NDI);

aliphatic diisocyanate compounds such as 1,6-hexamethylene diisocyanate (HDI) and tetramethylene diisocyanate;

alicyclic diisocyanate compounds such as 2,4-diisocyanate-1-methylcyclohexane, isophorone diisocyanate (IPDI), cyclohexylmethane diisocyanate, methylcyclohexane diisocyanate, norbornane diisocyanate (NBDI), nuclear hydrogenated XDI (H6-XDI) and nuclear hydrogenated MDI (H12-MDI); and araliphatic diisocyanate compounds such as xylylene diisocyanate (XDI) and tetramethylxylylene diisocyanate (TMXDI).

In a preferred embodiment of the present invention, the polyisocyanate compound may be 1,6-hexamethylene diisocyanate (HDI) in terms of commercial availability and cost.

4. Resin Solution Containing Polycarbonate Resin Composition

The coating resin solution of the present invention is a solution obtained by dissolving the above-described polycarbonate resin composition in a solvent containing a non-halogenated solvent, which, when directly used in this state, results a coating of a so-called clear color. The coating may be colored by further dissolving or dispersing a dye or a pigment of a desired color in the solution.

As mentioned above, the solvent of the coating resin solution of the present invention is a solvent containing a non-halogenated solvent, which is preferably a solvent containing a non-halogenated organic solvent as the main solvent. The non-halogenated organic solvent that can be used as the solvent of the coating resin solution of the present invention may contain one or more kinds of solvents selected from the group consisting of ester-based solvents, ether-based solvents, carbonate ester-based solvents and ketone-based solvents. Specifically, the solvent of the coating resin solution of the present invention contains, as the main component, a solvent that is generally used in a paint or the like, examples specifically including ester-based solvents such as methyl acetate, ethyl acetate, propyl acetate, butyl acetate, 2-ethoxy ethyl acetate, 2-methoxy-1-methylethyl acetate and ethyl lactate, ketone-based solvents such as acetone, methyl ethyl ketone, methyl isobutyl ketone, cyclohexanone and isophorone, carbonate ester-based solvents such as dimethyl carbonate and ethyl methyl carbonate, ether-based solvents such as tetrahydrofuran, 1,4-dioxane, diethyl ether, dimethoxymethane, ethyl cellosolve and anisole, and aromatic hydrocarbon-based solvents such as toluene, ethylbenzene, xylene, pseudocumene and mesitylene. In addition, an alcohol-based poor solvent such as ethanol or isopropyl alcohol or a hydrocarbon-based poor solvent such as n-heptane, cyclohexane or mineral spirits may further be used in a small amount. Among them, the composition is preferably dissolved in an ester-based solvent such as propyl acetate or butyl acetate, a ketone-based solvent such as methyl ethyl ketone or cyclohexanone or an ether-based solvent such as tetrahydrofuran or dimethoxymethane, which are inexpensive, good in workability and relatively safe, and particularly preferably dissolved in methyl ethyl ketone or propyl acetate.

Moreover, since halogenated solvents such as dichloromethane greatly affect the environment of the coating work, they are preferably not used as the main solvent of the coating resin solution of the present invention.

In one embodiment of the present invention, the resin solution contains the above-described polycarbonate resin composition and the non-halogenated organic solvent. In one embodiment of the present invention, the above-described polycarbonate resin composition may be a crosslinked polymer composition which is at least partially crosslinked.

While the viscosity of the coating resin solution of the present invention can be controlled at will according to the coating method desired, it is preferably in a range of 10-20,000 mPa/s. The viscosity is preferably 400-20,000 mPa/s for airless spraying, brush painting and roller painting, 100-6,000 mPa·s for air-assisted spraying, and 10-500 mPa·s for dip painting and can spraying.

In order to enhance the color effect of the coating resin solution of the present invention, a pigment, a dye, color particles or particles with a light interfering property can be added. Examples of the pigment and the dye include organic pigments such as an azo pigment or a phthalocyanine pigment, specifically, for example, Red No. 104, Red No. 106, Red No. 201, Red No. 202, Red No. 204, Red No. 215, Red No. 220, Orange No. 203, Orange No. 204, Blue No. 1, Blue No. 404, Yellow No. 205, Yellow No. 401 and Yellow No. 405. Moreover, for imparting a white color, pearl color, metal color or lame appearance, mica titanium, titanium oxide, iron oxide, tin oxide, zirconium oxide, chromium oxide, bismuth oxychloride, silica, chromium, titanium nitride, titanium, magnesium fluoride, gold, silver, nickel or the like may also be used. The particles with a light interfering property refer to particles that enhances the color effect by light reflection or light scattering, examples including glass beads, tiny seashells and mica. They are preferably added as necessary in an amount in a range of 0.0001-10.0% by mass in the coating.

Furthermore, a rust proofing agent, an antioxidant, a dispersant, a UV absorber, a defoaming agent, a leveling agent or the like can be added as necessary.

Although the amount of the polycarbonate resin added to the coating resin solution of the present invention depends on the intrinsic viscosity and the solvent solubility, it is preferably 1-50% by mass, and more preferably 4-30% by mass. As long as the concentration is within this range, good balance between the solvent solubility and the coating property as well as improved workability and appearance can be achieved.

A coating obtained by applying the coating resin solution of the present invention is less likely to be damaged or peel off due to scratch, impact or the like during transportation or upon use, as compared to coatings of conventional polycarbonate coating resin solutions.

The thickness of the coating obtained by applying the coating resin solution of the present invention is preferably in a range of 5-200 µm, more preferably 10-120 µm and still more preferably 15-60 µm. A coating thinner than 5 µm may lack strength and the damage is likely to reach the substrate, whereas if the thickness exceeds 200 µm, peeling is likely to be caused due to contraction of the coating, which are economically disadvantageous considering the usage of the eventually peeled off or discarded coating.

In one embodiment of the present invention, the above-described resin solution may be used as a binder resin solution to serve as a print ink. Such a print ink can be used, for example, for decoration print. In general, the print ink for decoration print is mainly composed of a solvent, a dye/pigment and a binder resin. Examples of the dye/pigment used in the above-described print ink include, but not limited to, dyes such as anthraquinone- and naphthoquinone-based dyes, inorganic pigments such as titanium oxide, carbon black, calcium carbonate and metal particles, organic pigments such as an azo pigment and a phthalocyanine pigment. These dye/pigment exists, along with the binder resin, in a dissolved or dispersed state in the ink. A print ink that uses the resin solution of the present invention as a binder resin solution will have excellent adhesiveness.

In addition to the binder resin and the dye/pigment, the above-described print ink may also be added with organic particles, inorganic particles, a mold release agent, an antioxidant, a plasticizer, a dispersant, an infrared absorber, an antistatic agent, a UV absorber, a defoaming agent, a leveling agent or the like as necessary.

Furthermore, while the amount of the binder resin added to the ink depends on the intrinsic viscosity and the solvent solubility, it is preferably 1-70% by mass, and more preferably 5-50% by mass. As long as the concentration of the binder resin is within this range, good balance between the solvent solubility and the ink applicability as well as improved workability can be achieved.

In one embodiment of the present invention, the above-described print ink is printed on a substrate film for decoration and then dried to remove the solvent. As a result, the dye/pigment is fixed to the binder resin while the binder resin adheres to the film, thereby obtaining a decoration printed film, i.e., a substrate film applied with the above-described print ink. A common technique can be employed as a method for applying the print ink to the substrate, examples including, but not limited to, screen printing, gravure printing, flexographic printing and the like.

One embodiment of the present invention provides a film or a coating containing the above-described polycarbonate resin composition or a crosslinked polymer composition in which at least a part of the above-described polycarbonate resin composition is crosslinked.

In one embodiment of the present invention, the above-described film or coating can be obtained by applying the coating resin solution or the print ink of the present invention to a substrate and thereafter subjecting the resultant to heating or drying. In one embodiment of the present invention, the above-described film or coating may be either a monolayer or a multilayer.

5. Physical Properties of Polycarbonate Resin Composition and Coating Resin Solution (i) Viscosity Average Molecular Weight (Mv)

In one embodiment of the present invention, the viscosity average molecular weight (Mv) of the polycarbonate resin composition may be 10,000-60,000. According to the present invention, the viscosity average molecular weight (Mv) of the polycarbonate resin composition is preferably 14,000-55,000, more preferably 16,000-50,000, and still more preferably 18,000-45,000. In a preferred embodiment of the present invention, the viscosity average molecular weight (Mv) of the polycarbonate resin composition may be 18,000-45,000.

Method for Measuring Viscosity Average Molecular Weight (Mv)

According to the present invention, the viscosity-average molecular weight was derived from the following equation:

$$\eta = 1.23 \times 10^{-4} \times Mv^{0.83}$$

where the intrinsic viscosity [η] (deciliters/gram) was determined under the following measurement conditions at a Huggins constant of 0.45.
Measurement instrument: Ubbelohde capillary viscometer
Solvent: Dichloromethane
Concentration of resin solution: 0.5 grams/deciliter
Measurement temperature: 25° C.

(ii) Mass Average Molecular Weight (Mw)

The present inventors found that the mass average molecular weight (Mw) of a coating resin solution containing the polycarbonate resin composition, which has been prepared, applied and air-dried, increased when it was subjected to a heat drying treatment. Specifically, such a treatment seems to form a crosslinked polymer composition in which at least a part of the above-described polycarbonate resin composition is crosslinked. As described above, a compound containing two or more isocyanate groups per molecule is used as the polyisocyanate compound in the present invention, and this seems to contribute to the formation of the crosslinked polymer composition.

Conditions for Measurement in Gel Permeation Chromatograph (GPC) Analysis

The mass average molecular weights (Mw) of the polycarbonate resin and the cured polycarbonate resin composition of the present invention were measured by a gel permeation chromatograph analysis conducted under the following conditions.
Instrument used: HPLC system, Aliance manufactured by Waters
Column: Shodex 805L manufactured by Showa Denko K.K. (two columns)
Eluent: Chloroform
Flow rate: 1.0 ml/min
Sample: 0.25 w/v % Chloroform solution sample
Detection: UV detection at 254 nm Both of the mass average molecular weight (Mw) with respect to polystyrene (PS) and the mass average molecular weight (Mw) with respect to polycarbonate (PC) were determined. The following conversion formula was employed.

Mw (with respect to PC)=0.4782×[Mw (with respect to PS)]$^{1.014706}$

Method for Measuring Hydroxyl Value

The hydroxyl value of the polycarbonate resin used in the present invention was measured under the following conditions.
Test method: carried out following JIS K0070 (potentiometric titration method)
Measurement instrument: Potentiometric titrator
Electrode: Composite glass electrode (iii) Durability Against Peeling (Adhesiveness)

After the coating resin solution of the present invention was applied, air-dried and subjected to a heat drying treatment, durability against peeling (adhesiveness) was tested by the cross-cut test described below.

Cross-Cut Test

An adhesion test was performed by a cross-cut adhesion test (1 mm spacing) following JIS K5600-5-6 using 24-mm wide sellotape (adhesion 4.01 N/10 mm) manufactured by Nichiban Co., Ltd. compliant with the cross-cut test. Based on the JIS classification, adhesion was assessed on a 0 (no detachment) to 5 (almost entirely detached) scale, which was used as the rate of the durability against peeling.

EXAMPLES

Hereinafter, examples of the present invention will be described along with comparative examples to describe the invention in detail, although the present invention is not limited to these examples.

Example 1

In 600 ml of a 9 w/w % aqueous sodium hydroxide solution and 200 ml of pure water, 108 g (0.37 mol) of 1,1-bis(4-hydroxyphenyl)-1-phenylethane (hereinafter, simply referred to as "BPAP": manufactured by Honshu Chemical Industry Co., Ltd.), 2.88 g (0.021 mol, content of terminal structure: 5.6 mol %) of p-hydroxyphenethyl alcohol (hereinafter, simply referred to as "PHEP": manufactured by Otsuka Chemical Co., Ltd.) and 0.3 g of hydrosulfite were dissolved.

To this, 200 ml of methylene chloride was added and 51.6 g of phosgene was blown into the resultant by spending about 30 minutes while stirring and maintaining the temperature at 15-20° C.

At the end of phosgene blowing, 100 ml of a 9 w/w% aqueous sodium hydroxide solution was added and vigorously stirred to emulsify the reaction solution, to which 0.5 ml of triethylamine was added as a polymerization catalyst to allow polymerization by stirring at 20-30° C. for about 40 minutes.

At the end of polymerization, the reaction solution was separated into an aqueous phase and an organic phase. The organic phase was neutralized with phosphoric acid, and repeatedly washed with water until the conductivity of the rinsing liquid (aqueous phase) became 10 μS/cm or lower. The obtained polymer solution was dropped into warm water kept at 60° C. to evaporate the solvent away, thereby obtaining a white powdery precipitate. The obtained precipitate was filtered and dried at 105° C. for 24 hours, thereby obtaining polymer powder.

The resulting polycarbonate resin (hereinafter, simply referred to as "PC-1") had Mv of 19,700, Mw of 54,000 (with respect to PS) and 30,300 (with respect to PC), and a hydroxyl value of 11 mg KOH/g.

A resin composition containing PC-1 (10 parts by mass) and 1 part by mass (10 parts by mass relative to 100 parts by mass of the polycarbonate resin) of hexamethylene diisocyanate (hereinafter, simply referred to as "HDI") was dissolved in 55 parts by mass of toluene to prepare a paint solution (resin solution). This paint solution was applied to (painted on) a stainless steel plate, air-dried, and then heated to 110° C. to dry for 5 hours to give a test piece. The dried polycarbonate resin composition (crosslinked polymer) had Mw of 58,900 (with respect to PS) and 33,100 (with respect to PC). According to the cross-cut test following JIS K5600-5-6, the test piece was rated 0.

Example 2

Polymerization was conducted in the same manner as Example 1 except that 103.8 g (0.39 mol) of 1,1-bis(4-hydroxyphenyl)cyclohexane (hereinafter, simply referred to as "BPZ": manufactured by Honshu Chemical Industry Co., Ltd.) was used instead of BPAP and that the amount of PHEP was changed to 1.53 g (0.011 mol, content of terminal structure: 2.9 mol %) to give a polycarbonate resin (Mv: 30,600, Mw: 89,100 (with respect to PS) and 50,400 (with respect to PC), hydroxyl value: 5 mg KOH/g; hereinafter, referred to as "PC-2"). PC-2 (10 parts by mass) and 1 part by mass (10 parts by mass relative to 100 parts by mass of the polycarbonate resin) of HDI were dissolved in 55 parts by mass of toluene to prepare and assess a paint solution in the same manner as Example 1. The dried polycarbonate resin composition had Mw of 95,900 (with respect to PS) and 54,300 (with respect to PC).

Example 3

Polymerization was conducted in the same manner as Example 1 except that 101.7 g (0.38 mol) of 2,2-bis(4-hydroxyphenyl)-4-methylpentane (hereinafter, simply referred to as "MIBK": manufactured by Honshu Chemical Industry Co., Ltd.) was used instead of BPAP and the amount of PHEP was changed to 0.79 g (0.006 mol, content of terminal structure: 1.5 mol %) to give a polycarbonate resin (Mv: 43,500, Mw: 124,200 (with respect to PS) and 70,600 (with respect to PC), hydroxyl value: 3 mg KOH/g; hereinafter, simply referred to as "PC-3"). PC-3 (10 parts by mass) and 1 part by mass (10 parts by mass relative to 100 parts by mass of the polycarbonate resin) of HDI were dissolved in 55 parts by mass of toluene to prepare and assess a paint solution in the same manner as Example 1. The dried polycarbonate resin composition had Mw of 130,300 (with respect to PS) and 74,100 (with respect to PC).

Example 4

In 600 ml of a 9 w/w % aqueous sodium hydroxide solution and 200 ml of pure water, 48.0 g (0.19 mol) of 2,2-bis(4-hydroxy-3-methylphenyl-)propane (hereinafter, simply referred to as "BPC": manufactured by Honshu Chemical Industry Co., Ltd.), 32.0 g (0.14 mol) of 2,2-bis(4-hydroxyphenyl)propane (hereinafter, simply referred to as "BPA": manufactured by Mitsubishi Chemical Corporation), 2.25 g (0.016 mol, content of terminal structure: 4.7 mol %) of PHEP and 0.3 g of hydrosulfite were dissolved.

To this, 200 ml of methylene chloride and 0.08 g of benzyltriethylammonium chloride (hereinafter, simply referred to as "TEBAC") were added and then 46.9 g of phosgene was blown into the resultant by spending about 30 minutes while stirring and maintaining the temperature at 15-20° C.

At the end of phosgene blowing, 100 ml of a 9 w/w % aqueous sodium hydroxide solution was added and vigorously stirred to emulsify the reaction solution. At the end of emulsification, 0.5 ml of triethylamine was added to the resultant to allow polymerization by stirring at 20-30° C. for about an hour.

At the end of polymerization, the reaction solution was separated into an aqueous phase and an organic phase. The organic phase was neutralized with phosphoric acid, and repeatedly washed with water until the conductivity of the rinsing liquid (aqueous phase) became 10 µS/cm or lower. The obtained polymer solution was dropped into warm water kept at 60° C. to evaporate the solvent away, thereby obtaining a white powdery precipitate.

The obtained precipitate was filtered and dried at 105° C. for 24 hours, thereby obtaining polymer powder.

The resulting polycarbonate resin (hereinafter, simply referred to as "PC-4") had Mv of 25,500, Mw of 57,000 (with respect to PS) and 32,000 (with respect to PC), and a hydroxyl value of 8 mg KOH/g. PC-4 (10 parts by mass) and 1 part by mass (10 parts by mass relative to 100 parts by mass of the polycarbonate resin) of xylylene diisocyanate (XDI) were dissolved in 55 parts by mass of toluene to prepare and assess a paint solution in the same manner as Example 1. The dried polycarbonate resin composition had Mw of 65,700 (with respect to PS) and 37,000 (with respect to PC).

Example 5

PC-4 (10 parts by mass) and 0.01 parts by mass (0.1 parts by mass relative to 100 parts by mass of the polycarbonate resin) of HDI were dissolved in 55 parts by mass of toluene to prepare and assess a paint solution in the same manner as Example 1. The dried polycarbonate resin composition had Mw of 58,400 (with respect to PS) and 32,800 (with respect to PC).

Example 6

PC-4 (10 parts by mass) and 1 part by mass (10 parts by mass relative to 100 parts by mass of the polycarbonate resin) of HDI were dissolved in 55 parts by mass of toluene to prepare and assess a paint solution in the same manner as Example 1. The dried polycarbonate resin composition had Mw of 69,900 (with respect to PS) and 39,400 (with respect to PC).

Example 7

Polymerization was conducted in the same manner as Example 4 except that 71.4 g (0.21 mol) of 2,2-bis(4-hydroxyphenyl)hexafluoropropane (hereinafter, simply referred to as "BPAF": manufactured by Central Glass Co., Ltd.) was used instead of BPC, and the amounts of BPA and PHEP were changed to 20.4 g (0.09 mol) and 0.833 g (0.006 mol, content of terminal structure: 2.0 mol %), respectively, to give a polycarbonate resin (Mv: 27,300, Mw: 84,200 (with respect to PS) and 47,600 (with respect to PC), hydroxyl value: 6 mg KOH/g; hereinafter, simply referred to as "PC-A"). PC-A (10 parts by mass) and 0.25 parts by mass (2.5 parts by mass relative to 100 parts by mass of the polycarbonate resin) of HDI were dissolved in 55 parts by mass of toluene to prepare and assess a paint solution in the same manner as Example 1. The dried polycarbonate resin composition had Mw of 91,700 (with respect to PS) and 51,900 (with respect to PC).

Comparative Example 1

Polymerization was conducted in the same manner as Example 1 except that PHEP was changed to 2.21 g (0.015 mol, content of terminal structure: 4.0 mol %) of PTBP to give a polycarbonate resin (Mv: 20,000, Mw: 56,600 (with respect to PS) and 31,800 (with respect to PC), hydroxyl value: 0 mg KOH/g; hereinafter, simply referred to as "PC-5"). A paint solution was prepared and assessed in the same manner as Example 1 except that HDI was not used and PC-5 was used instead of PC-1. The dried polycarbonate resin composition had Mw of 56,600 (with respect to PS) and 31,800 (with respect to PC).

Comparative Example 2

A paint solution was prepared and assessed in the same manner as Example 1 except that PC-5 was used instead of PC-1. The dried polycarbonate resin composition had Mw of 56,600 (with respect to PS) and 31,800 (with respect to PC).

Comparative Example 3

A paint solution was prepared and assessed in the same manner as Example 1 except that PC-5 was used instead of PC-1 and the amount of HDI was changed to 3 parts by mass (30 parts by mass relative to 100 parts by mass of the polycarbonate resin). The dried polycarbonate resin composition had Mw of 56,600 (with respect to PS) and 31,800 (with respect to PC).

Comparative Example 4

Polymerization was conducted in the same manner as Example 2 except that PHEP was changed to 1.17 g (0.008 mol, content of terminal structure: 2.0 mol %) of PTBP to give a polycarbonate resin (Mv: 32,500, Mw: 98,900 (with respect to PS) and 56,000 (with respect to PC), hydroxyl value: 0 mg KOH/g; hereinafter, simply referred to as "PC-6"). A paint solution was prepared and assessed in the same manner as Example 2 except that PC-6 was used instead of PC-2. The dried polycarbonate resin composition had Mw of 98,900 (with respect to PS) and 56,000 (with respect to PC).

Comparative Example 5

Polymerization was conducted in the same manner as Example 3 except that PHEP was changed to 0.71 g (0.005 mol, content of terminal structure: 1.3 mol %) of PTBP to give a polycarbonate resin (Mv: 50,000, Mw: 149,900 (with respect to PS) and 85,400 (with respect to PC), hydroxyl value: 0 mg KOH/g; hereinafter, simply referred to as "PC-7"). A paint solution was prepared and assessed in the same manner as Example 3 except that PC-7 was used instead of PC-3. The dried polycarbonate resin composition had Mw of 149,900 (with respect to PS) and 85,400 (with respect to PC).

Comparative Example 6

Polymerization was conducted in the same manner as Example 4 except that PHEP was changed to 1.47 g (0.013 mol, content of terminal structure: 3.0 mol %) of PTBP to give a polycarbonate resin (Mv: 26,000, Mw: 61,500 (with respect to PS) and 34,600 (with respect to PC), hydroxyl value: 0 mg KOH/g; hereinafter, simply referred to as "PC-8"). A paint solution was prepared and assessed in the same manner as Example 4 except that HDI was not used and PC-8 was used instead of PC-4. The dried polycarbonate resin composition had Mw of 61,500 (with respect to PS) and 34,600 (with respect to PC).

Comparative Example 7

A paint solution was prepared and assessed in the same manner as Example 1 except that HDI was not used. The dried polycarbonate resin composition had Mw of 54,000 (with respect to PS) and 30,300 (with respect to PC).

Comparative Example 8

A paint solution was prepared and assessed in the same manner as Example 2 except that HDI was not used. The dried polycarbonate resin composition had Mw of 89,100 (with respect to PS) and 50,400 (with respect to PC).

Comparative Example 9

A paint solution was prepared and assessed in the same manner as Example 4 except that HDI was not used. The dried polycarbonate resin composition had Mw of 57,000 (with respect to PS) and 32,000 (with respect to PC).

The durability against peeling measured for the paint solutions of the above-described examples and comparative examples are shown in the following table.

Here, the polycarbonate resins used in the above-described examples and comparative examples were as follows.

TABLE 2

|  | Main backbone | Terminal structure | Mv | Mw (with respect to PS) | Mw (with respect to PS) | Hydroxyl value [mg KOH/g] |
|---|---|---|---|---|---|---|
| PC-1 | BPAP | PHEP | 19,700 | 54,000 | 30,300 | 11 |
| PC-2 | BPZ | PHEP | 30,600 | 89,100 | 50,400 | 5 |
| PC-3 | MIBK | PHEP | 43,500 | 124,200 | 70,600 | 3 |
| PC-4 | BPC/BPA | PHEP | 25,500 | 57,000 | 32,000 | 8 |
| PC-5 | BPAP | PTBP | 20,000 | 56,600 | 31,800 | 0 |
| PC-6 | BPZ | PTBP | 32,500 | 98,900 | 56,000 | 0 |
| PC-7 | MIBK | PTBP | 50,000 | 149,900 | 85,400 | 0 |
| PC-8 | BPC/BPA | PTBP | 26,000 | 61,500 | 34,600 | 0 |
| PC-A | BPAF/BPA | PHEP | 27,300 | 84,200 | 47,600 | 6 |

As described above, the resin composition of the present invention had improved adhesiveness between the coating and a substrate and thus was demonstrated to be useful as a resin blend composition comprising the polycarbonate resin and other resin.

The resin composition of the present invention can be used as a coating resin solution for protecting objects. In particular, the resin composition of the present invention is favorable in the fields that require durability of coating in daily life, like IC cards and security cards.

The invention claimed is:

1. A resin solution comprising a polycarbonate resin composition and a non-halogenated organic solvent, the polycarbonate resin composition comprising:
   100 parts by mass of a terminal-modified polycarbonate resin (A) having a terminal structure represented by structural formula (1) below and a structural unit (2) below; and

TABLE 1

| Example/Comparative example | PC | Main backbone | Terminal structure | Polyisocyanate (Amount added relative to PC) | Durability against peeling |
|---|---|---|---|---|---|
| Example 1 | PC-1 | BPAP | PHEP | HDI (10 parts by mass) | 0 |
| Example 2 | PC-2 | BPZ | PHEP | HDI (10 parts by mass) | 0 |
| Example 3 | PC-3 | MIBK | PHEP | HDI (10 parts by mass) | 0 |
| Example 4 | PC-4 | BPC/BPA | PHEP | XDI (10 parts by mass) | 0 |
| Example 5 | PC-4 | BPC/BPA | PHEP | HDI (0.1 parts by mass) | 1 |
| Example 6 | PC-4 | BPC/BPA | PHEP | HDI (10 parts by mass) | 0 |
| Example 7 | PC-A | BPAF/BPA | PHEP | HDI (2.5 parts by mass) | 0 |
| Comparative example 1 | PC-5 | BPAP | PTBP | — | 5 |
| Comparative example 2 | PC-5 | BPAP | PTBP | HDI (10 parts by mass) | 5 |
| Comparative example 3 | PC-5 | BPAP | PTBP | HDI (30 parts by mass) | 5 |
| Comparative example 4 | PC-6 | BPZ | PTBP | HDI (10 parts by mass) | 5 |
| Comparative example 5 | PC-7 | MIBK | PTBP | HDI (10 parts by mass) | 5 |
| Comparative example 6 | PC-8 | BPC/BPA | PTBP | — | 5 |
| Comparative example 7 | PC-1 | BPAP | PHEP | — | 5 |
| Comparative example 8 | PC-2 | BPZ | PHEP | — | 5 |
| Comparative example 9 | PC-4 | BPC/BPA | PHEP | — | 3 | not less than 0.1 parts by mass of a polyisocyanate compound,

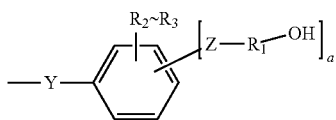

(in formula (1)),
$R_1$ represents an optionally substituted $C_1$-$C_{20}$ alkylene group or $C_2$-$C_{20}$ alkenylene group,
$R_2$ and $R_3$ each independently represent hydrogen, a $C_1$-$C_{20}$ alkyl group, a $C_1$-$C_{10}$ alkoxy group or a $C_6$-$C_{12}$ aryl group,
Z represents an ether bond, a carbonyl group, an ester bond or a single bond,
a is an integer of 1-3, and
Y represents an ether bond or an ester group),

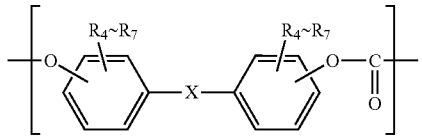

(in formula (2),
$R_4$-$R_7$ each independently represent hydrogen, fluorine, chlorine, bromine, iodine, or an optionally substituted $C_1$-$C_{20}$ alkyl group, $C_6$-$C_{12}$ aryl group, $C_2$-$C_{12}$ alkenyl group, $C_1$-$C_5$ alkoxy group or $C_7$-$C_{17}$ aralkyl group, and
X is —O—, —S—, —SO—, —SO$_2$—, —CO— or a divalent group represented by any of general formulae (4)-(6) or (8) below)

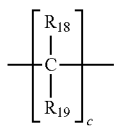

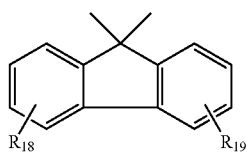

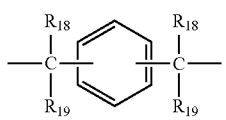

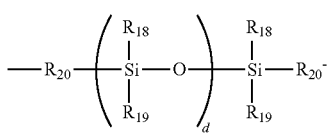

in general formulae (4)-(6) and (8),
$R_{18}$ and $R_{19}$ each independently represent hydrogen, a halogen, an optionally substituted $C_1$-$C_{20}$ alkyl group, an optionally substituted $C_1$-$C_5$ alkoxy group, an optionally substituted $C_6$-$C_{12}$ aryl group, an optionally substituted $C_7$-$C_{17}$ aralkyl group or an optionally substituted $C_2$-$C_{15}$ alkenyl group, or
$R_{18}$ and $R_{19}$ bind to each other to form a $C_3$-$C_{20}$ carbocyclic ring or a $C_1$-$C_{20}$ heterocyclic ring,
$R_{20}$ is an optionally substituted $C_1$-$C_9$ alkylene group,
c represents an integer of 0-20, and
d represents an integer of 1-500);
wherein the terminal structure represented by structural formula (1) is contained in an amount of 0.5 mol % to 8 mol % relative to the amount of the structural unit (2).

2. The resin solution according to claim 1, wherein, in structural formula (1) above, Z represents a single bond, $R_1$ is a $C_1$-$C_2$ alkylene group, and $R_2$-$R_3$ are hydrogen.

3. The resin solution according to claim 1, wherein, in the structural unit (2), X is —O—, —S— or a divalent group represented by general formula (4) above.

4. The resin solution according to claim 1, wherein the structural unit (2) is any one or more kinds selected from the group consisting of formulae (9)-(22) below:

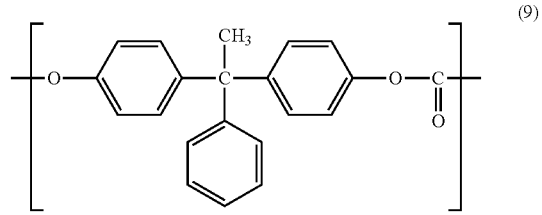

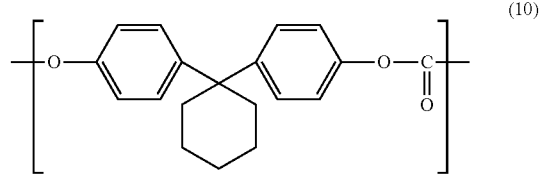

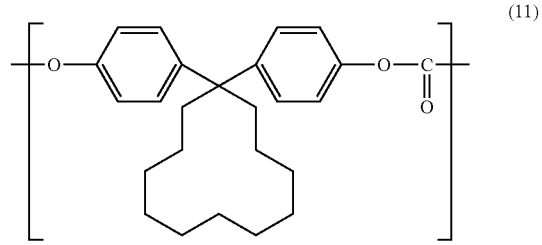

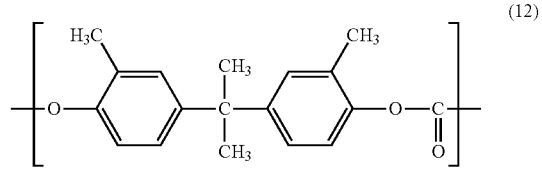

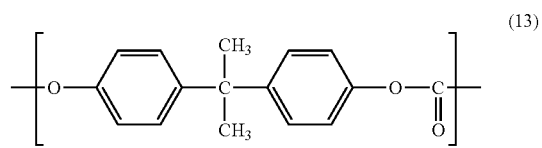

-continued

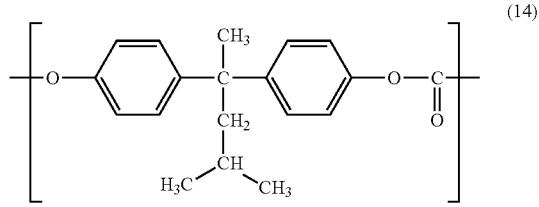
(14)

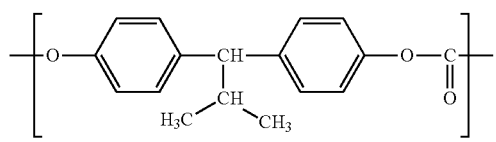
(15)

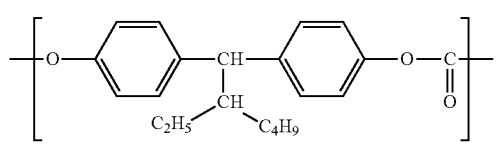
(16)

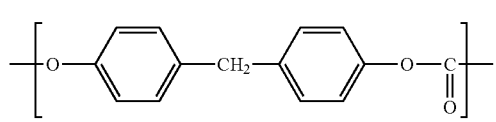
(17)

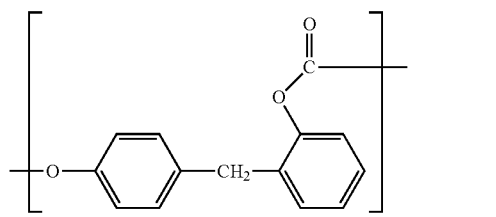
(18)

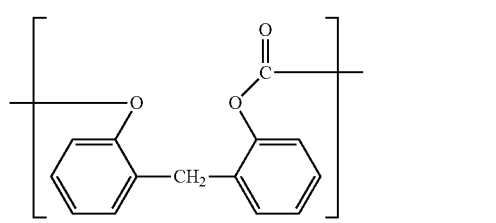
(19)

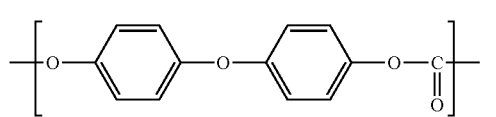
(20)

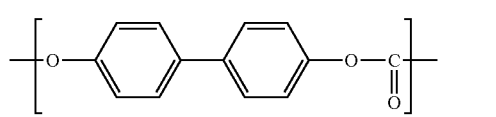
(21)

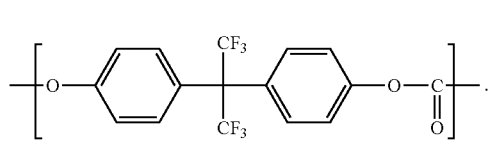
(22)

5. The resin solution according to claim 1, wherein the structural unit (2) is derived from a bisphenol compound.

6. The resin solution according to claim 5, wherein the bisphenol compound is selected from the group consisting of bisphenol A, bisphenol AP, bisphenol Z, bisphenol CD, bisphenol C, bisphenol IOTD, bisphenol IBTD, bisphenol MIBK and bisphenol AF.

7. The resin solution according to claim 1, wherein the terminal structure represented by structural formula (1) above is p-hydroxyphenethyl alcohol (PHEP).

8. The resin solution according to claim 1, wherein the terminal structure represented by structural formula (1) is contained in an amount of 1.0 mol % to 8 mol % relative to the amount of the structural unit (2).

9. The resin solution according to claim 1, wherein the polyisocyanate compound is an isocyanate compound containing two or more isocyanate groups per molecule.

10. The resin solution according to claim 9, wherein the isocyanate compound is a diisocyanate compound.

11. The resin solution according to claim 1, wherein the viscosity average molecular weight of the polycarbonate resin composition is 10,000-60,000.

12. A resin solution comprising a polycarbonate resin composition and a nonhalogenated organic solvent, wherein at least a part of the polycarbonate resin composition is crosslinked, wherein the polycarbonate resin composition comprising:
  100 parts by mass of a terminal-modified polycarbonate resin (A) having a terminal structure represented by structural formula (1) below and a structural unit (2) below; and
  not less than 0.1 parts by mass of a polyisocyanate compound,

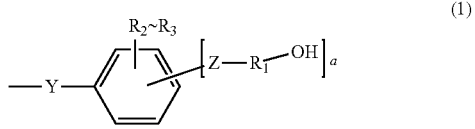
(1)

(in formula (1),
  $R_1$ represents an optionally substituted $C_1$-$C_{20}$ alkylene group or $C_2$-$C_{20}$ alkenylene group,
  $R_2$ and $R_3$ each independently represent hydrogen, a $C_1$-$C_{20}$ alkyl group, a $C_1$-$C_{10}$ alkoxy group or a $C_6$-$C_{12}$ aryl group,
  Z represents an ether bond, a carbonyl group, an ester bond or a single bond,
  a is an integer of 1-3, and
  Y represents an ether bond or an ester group),

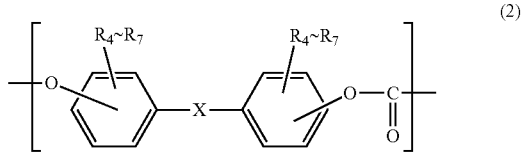
(2)

(in formula (2),
  $R_4$-$R_7$ each independently represent hydrogen, fluorine, chlorine, bromine, iodine, or an optionally substituted $C_1$-$C_{20}$ alkyl group, $C_6$-$C_{12}$ aryl group, $C_2$-$C_{12}$ alkenyl group, $C_1$-$C_5$ alkoxy group or $C_7$-C17 aralkyl group, and
  X is —O—, —S—, —SO—, —SO$_2$—, —CO— or a divalent group represented by any of general formulae (4)-(6), or (8) below)

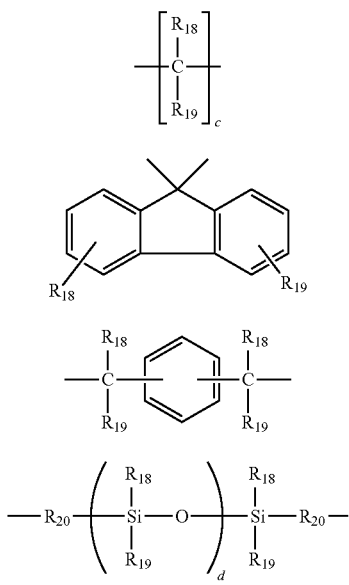

in general formulae (4)-(6) and (8), $R_{18}$ and $R_{19}$ each independently represent hydrogen, a halogen, an optionally substituted $C_1$-$C_{20}$ alkyl group, an optionally substituted $C_1$-$C_5$ alkoxy group, an optionally substituted $C_6$-$C_{12}$ aryl group, an optionally substituted $C_7$-$C_{17}$ aralkyl group or an optionally substituted $C_2$-$C_{15}$ alkenyl group, or $R_{18}$ and $R_{19}$ bind to each other to form a $C_3$-$C_{20}$ carbocyclic ring or a $C_1$-$C_{20}$ heterocyclic ring, $R_{20}$ is an optionally substituted $C_1$-$C_9$ alkylene group, c represents an integer of 0-20, and d represents an integer of 1-500);

wherein the terminal structure represented by structural formula (1) is contained in an amount of 0.5 mol % to 8 mol % relative to the amount of the structural unit (2).

13. A print ink comprising the resin solution according to claim 1 as a binder resin solution.

14. A print ink comprising the resin solution according to claim 12 as a binder resin solution.

15. A substrate film applied with the print ink according to claim 13.

16. A substrate film applied with the print ink according to claim 14.

17. A film or coating, comprising the resin solution according to claim 1.

18. A film or coating, comprising the resin solution according claim 12.

* * * * *